(12) United States Patent
Wiggins et al.

(10) Patent No.: US 11,111,050 B2
(45) Date of Patent: Sep. 7, 2021

(54) PILLAR-SHAPED CONTAINER

(71) Applicant: Mead Johnson Nutrition Company, Glenview, IL (US)

(72) Inventors: Robin P. Wiggins, Newburgh, IN (US); Johanna Kahn, Deerfield, IL (US)

(73) Assignee: MEAD JOHNSON NUTRITION COMPANY, Evansville, IN (US)

( * ) Notice: Subject to any disclaimer, the term of this patent is extended or adjusted under 35 U.S.C. 154(b) by 0 days.

(21) Appl. No.: 14/321,050

(22) Filed: Jul. 1, 2014

(65) Prior Publication Data

US 2016/0001915 A1   Jan. 7, 2016

(51) Int. Cl.
| | |
|---|---|
| B65D 8/12 | (2006.01) |
| B65D 1/16 | (2006.01) |
| B65D 21/02 | (2006.01) |
| B65D 43/02 | (2006.01) |
| A47J 47/04 | (2006.01) |
| B65D 8/00 | (2006.01) |

(52) U.S. Cl.
CPC .............. B65D 1/165 (2013.01); A47J 47/04 (2013.01); B65D 7/04 (2013.01); B65D 21/022 (2013.01); B65D 43/02 (2013.01)

(58) Field of Classification Search
CPC ...... B65D 1/165; B65D 21/022; B65D 43/02; B65D 7/04; A47J 47/04
USPC ......... D9/776; 220/735, 906, 907, 669, 674, 220/62.12, 675; 206/508
See application file for complete search history.

(56) References Cited

U.S. PATENT DOCUMENTS

| | | | |
|---|---|---|---|
| 3,317,110 A | | 5/1967 | Palmer |
| 3,341,059 A | * | 9/1967 | Schild .................... B65D 1/165 220/611 |
| 4,036,398 A | * | 7/1977 | Hoogvelt ............... A47G 21/04 220/270 |
| D268,739 S | | 4/1983 | Hampf |
| 5,762,230 A | | 6/1998 | Policappelli |
| D398,531 S | * | 9/1998 | De Vries ........................ D9/776 |
| 6,012,601 A | * | 1/2000 | Van Dam ................. B65D 1/44 220/667 |
| 6,220,475 B1 | * | 4/2001 | Nayar .................... B65D 1/165 220/669 |
| 6,889,866 B2 | | 5/2005 | Gilliam et al. |
| D543,845 S | * | 6/2007 | Ioannides ....................... D9/500 |

(Continued)

FOREIGN PATENT DOCUMENTS

| | | |
|---|---|---|
| DE | 8807749 | 8/1988 |
| DE | 202012004213 | 6/2012 |

(Continued)

OTHER PUBLICATIONS

Nescafé Tradição 1953 Instant Coffee MINTEL extract, database MINTEL GNPD, downloaded on the Jun. 8, 2020 (summary of relevance is found in the Notice of Opposition, p. 5-7).

(Continued)

*Primary Examiner* — James N Smalley
*Assistant Examiner* — Elizabeth J Volz
(74) *Attorney, Agent, or Firm* — Troutman Pepper Hamilton Sanders LLP; Ryan Schneider; Chris N. Davis

(57) ABSTRACT

A pillar shaped container for storing a granulated powder. The container has a sidewall having a cylindrical upper portion, a continuously concave curved intermediate portion and a cylindrical lower portion.

18 Claims, 3 Drawing Sheets

(56) References Cited

U.S. PATENT DOCUMENTS

| | | | |
|---|---|---|---|
| D549,596 S | * | 8/2007 | Ioannides .................. D9/776 |
| D567,089 S | | 4/2008 | Glydon et al. |
| D568,155 S | | 5/2008 | Glydon et al. |
| D588,936 S | * | 3/2009 | Ioannides .............. B65D 1/165 |
| | | | D9/776 |
| D598,181 S | | 8/2009 | Schwartz et al. |
| D637,711 S | | 5/2011 | Macaulay et al. |
| D646,966 S | | 10/2011 | Gill et al. |
| 8,042,704 B2 | | 10/2011 | Borowski et al. |
| 8,141,741 B2 | * | 3/2012 | Metzger ................ B65D 7/04 |
| | | | 220/672 |
| D663,210 S | * | 7/2012 | Diss ..................... B65D 1/165 |
| | | | D9/516 |
| D680,424 S | | 4/2013 | MacLean et al. |
| D690,200 S | | 9/2013 | Arand et al. |
| 8,590,732 B2 | | 11/2013 | Vandamme et al. |
| 2012/0205376 A1 | | 8/2012 | Yang et al. |
| 2012/0279964 A1 | | 11/2012 | McGeough |
| 2013/0320029 A1 | * | 12/2013 | Yourist ................ B65D 15/18 |
| | | | 220/646 |
| 2014/0299598 A1 | | 10/2014 | Irani et al. |
| 2016/0031594 A1 | * | 2/2016 | Ramsey ............... B65D 17/02 |
| | | | 220/272 |

FOREIGN PATENT DOCUMENTS

| | | |
|---|---|---|
| EM | 000203773 | 9/2004 |
| EM | 000546379 | 8/2008 |
| EM | 0010474350001 | 11/2008 |
| EM | 001099899 | 4/2009 |
| FR | 2639562 | 6/1990 |
| WO | 2012047891 | 4/2012 |

OTHER PUBLICATIONS

Expert Declaration by Luis Augusto, Jun. 12, 2020 (summary of relevance is found in the Notice of Opposition, p. 5-7).

Print-out of Internet page https://designinnova.blogspot.com/2011/09/novidades-da-nestle-para-setembro-2011.html (Sep. 2011) (summary of relevance is found in the Notice of Opposition, p. 5-7).

Print-out of Internet page https://www.embalagemmarca.com.br/2011/07/nestle-resgata-embalagens-antigas-de-nescafe/ (Jul. 2011) (summary of relevance is found in the Notice of Opposition, p. 5-7).

Notice of Opposition against EP 3164335 granted on Sep. 18, 2019 to MJN U.S. Holdings LLC, filed Jun. 17, 2020.

* cited by examiner

PILLAR-SHAPED CONTAINER

TECHNICAL FIELD

The present disclosure relates to a pillar-shaped container for holding a granular product or powder, such as infant formula. More specifically, the disclosure is directed to a container having a sidewall with a substantially circular cross-section, a cylindrical upper portion, a continuously concave curved intermediate portion and a cylindrical lower portion.

BACKGROUND

There are many products in granular or powdered form that are currently stored and sold in containers. These products include infant formula, flour, coffee, sugar and nutritional supplements, such as protein or dietary supplements. Because many of these items are stored, shipped and ultimately dispensed from the same container, the container should be robust enough to withstand the conditions to which it can be exposed.

Additionally, the container should be user-friendly for the ultimate consumer. A user-friendly container is one that is convenient for the ultimate user to store, use and from which to scoop, measure and dispense the product contained within.

Containers formed of plastic and/or metal are often used to store and sell various granular products, particularly in the industrial, food and pharmaceutical sectors. One problem often associated with such containers is damage during shipping due to stresses placed on the containers. Containers that are stronger and more structurally rigid are less likely to become compromised during shipment. Moreover, a container that becomes structurally compromised does not provide its contents adequate protection against contaminants, which can be more readily introduced, resulting in spoilage or other deleterious effects. As such, there is a need that containers be improved to reduce structural compromises.

Accordingly, there exists the need for a containers that are user-friendly. Additionally, there exists a need for a container that has increased structural rigidity.

BRIEF SUMMARY

In one embodiment, a container may include a sidewall and a bottom closing a cylindrical lower portion. The sidewall may have a substantially circular cross-section and a container height. The sidewall may have a cylindrical upper portion having an upper height defining a circular top. The sidewall may have a continuously concave curved intermediate portion extending downward from the upper portion. The sidewall may have the cylindrical lower portion having a lower height, where the cylindrical lower portion may extend downward from the intermediate portion. The upper height and the lower height combined may be in a range of from about 15% to about 35% of the container height.

In another embodiment, the pillar shaped metal can may include a circular bottom having a diameter in a range of from 100 mm to 150 mm. The pillar shaped metal can may have a sidewall having a lower portion extending from the circular bottom and having a lower height. The pillar shaped metal can may have a continuously curved concave portion extending upward from the lower portion, and an upper portion extending upward from the concave portion oppositely from the circular bottom. The upper portion may have an upper height and a circular opening. The lower height and the upper height combined may be in a range of from about 20% to about 50% of the concave portion. The continuously curved concave portion may have a narrowest cross-sectional area about which the container is vertically symmetrical. The narrowest cross-sectional area may have a diameter in a range of from about 80% to about 98% of the diameter of the circular bottom. The circular top may have a diameter substantially equal to the diameter of the circular bottom.

In another embodiment, the top may be open.

In some embodiments, the container may be metallic.

In a further embodiment, the upper portion of the container may have an upper height and the lower portion may be a lower height that is substantially equal to the upper height.

In an embodiment, the container may have an upper height and a lower height that are each at least 10% of the container height.

In an embodiment, the container may have an upper portion associated with a lid. The container may have a lower portion with a base configured to receive a raised circumferential lid portion in a lid of another like container such that multiple assembled containers can be stacked on top of one another.

In an embodiment, the container may have a container height in a range from about 50 mm to about 300 mm. In a further embodiment, the container height may be in a range of from about 75 mm to about 250 mm.

In an embodiment, the container may have a bottom with a bottom diameter of from about 50 mm to 200 mm. In a further embodiment, the bottom diameter may be from about 75 mm to about 175 mm.

In another embodiment, the container may have an intermediate portion with a narrowest cross-section area that has a diameter from about 80% to about 98% of the diameter of the bottom of the container.

In an embodiment, the can may have a can height in a range of from about 50 mm to about 300 mm. In a further embodiment, the can height may be in the range of from about 75 mm to about 250 mm. In a further embodiment, the can height may be in a range of from about 90 mm to about 175 mm.

In an embodiment, the can may have a lid mounted on the upper portion, and the lower portion may have a base configured to receive a raised circumferential lid portion in a lid of another like container such that multiple assembled containers can be stacked on top of one another.

In some embodiments, the can may have a narrowest cross-sectional area with a diameter in the range of from 2 mm to 20 mm less than the diameter of the circular bottom. In a further embodiment, the can may have a narrowest cross-sectional area with a diameter in a range of from about 4 mm to about 14 mm less than the diameter of the circular bottom.

In an embodiment, the can may have a lower height and an upper height that are each in a range from about 10% to about 20% of the can height.

In an embodiment, the can may have a lower height that is substantially equal to the upper height.

DETAILED DESCRIPTION

Figure 1:
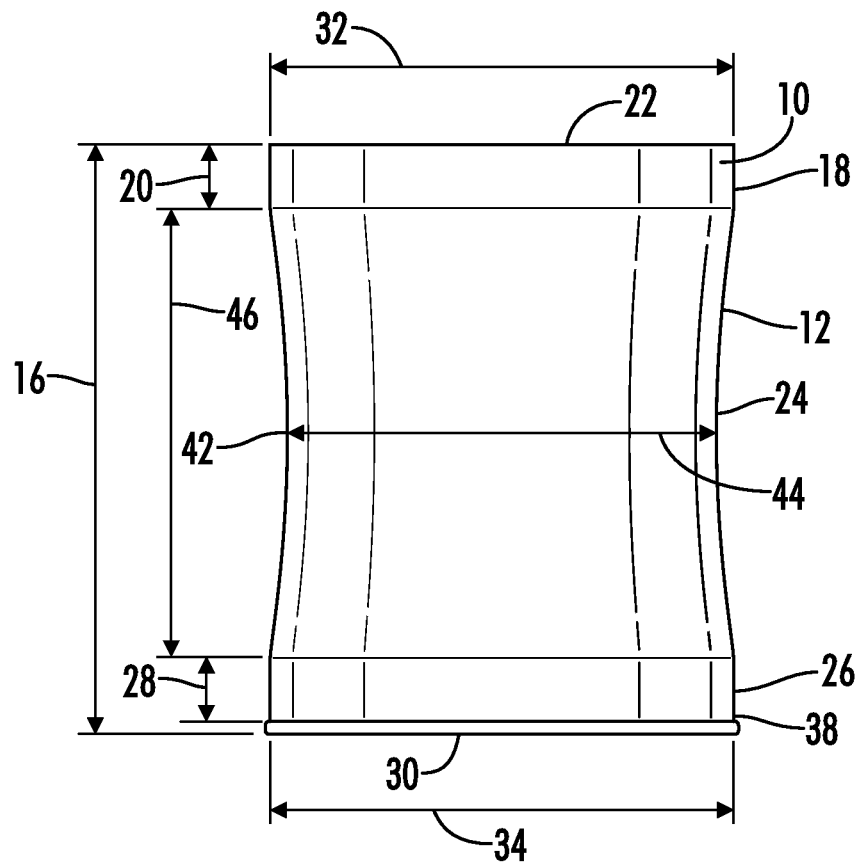
FIG. 1 is an elevation view of a container.

Reference now will be made in detail to the embodiments of the present disclosure. It will be apparent to those of ordinary skilled in the art that various modifications and variations can be made to the teachings of the present disclosure without departing from the scope of the disclosure. For instance, features illustrated or described as part of one embodiment, can be used with another embodiment to yield a further embodiment.

Thus, it is intended that the present disclosure covers such modifications and variations as come within the scope of the appended claims and their equivalents. Other objects, features and aspects of the present disclosure are disclosed in or are apparent from the following detailed description. It is to be understood by one of ordinary skill in the art that the present disclosure is a description of exemplary embodiments only and is not intended as limiting the broader aspects of the present disclosure.

For the sake of clarity, not all reference numerals are necessarily present in each drawing Figure. In addition, positional terms such as "upper," "lower," "side," "top," "bottom," "vertical," "horizontal," etc. refer to the container when in the orientation shown in the drawings. The skilled artisan will recognize that containers can assume different orientations when in use.

An elevation view of a container 10 is shown in FIG. 1. The container 10 may be described as pillar shaped. Container 10 is intended for use to store a granular product. Container 10 includes a sidewall 12 having a substantially circular cross-section. Container 10 has a container height 16. The sidewall 12 includes a cylindrical upper portion 18 having an upper height 20 which defines a circular top 22. The sidewall 12 includes a continuously concave curved intermediate portion 24 extending downward from cylindrical upper portion 18, and having a concave portion height 46. The sidewall 12 includes a cylindrical lower portion 26 having a lower height 28 and extending downward from the continuously concave curved intermediate portion 24. In FIG. 1, a bottom 30 closes the cylindrical lower portion 26.

The circular top 22 has a diameter 32, which may be substantially equal to the diameter 34 of the circular bottom 30.

The lower height 28 and the upper height 20 combined may be in a range from about 20% to about 50% of the concave portion height 46. The upper height 20 and the lower height 28 may each be at least 10% of the container height 16. The lower height 28 and the upper height 20 may each be in a range of from about 10% to about 20% of the container height 16. The lower height 28 may be substantially equal to the upper height 20.

The container 10 may be vertically symmetrical about the narrowest cross-sectional area 42. The narrowest cross-sectional area has a diameter 44, which may be in a range of from about 80% to about 98% of the diameter 34 of the circular bottom 30. The upper height 20 and the lower height 28 combined are in a range of from about 15% to about 35% of the container height 16.

The circular top 22 may be open so that end-users can access product held by the container 10 through the open circular top 22. In addition, product may be added to the container through the open circular top 22 during manufacture and the open circular top 22 can be then be sealed prior to the end-users' use. The product may be similarly added through the bottom end of the container during manufacture before the bottom 30 is attached to the sidewall 12. The end-user can then remove the seal mechanism and access the product through the circular top 22.

The container 10 may be metallic. A metallic container 10 may be constructed of, for example, aluminum, steel or tin.

Figure 7:
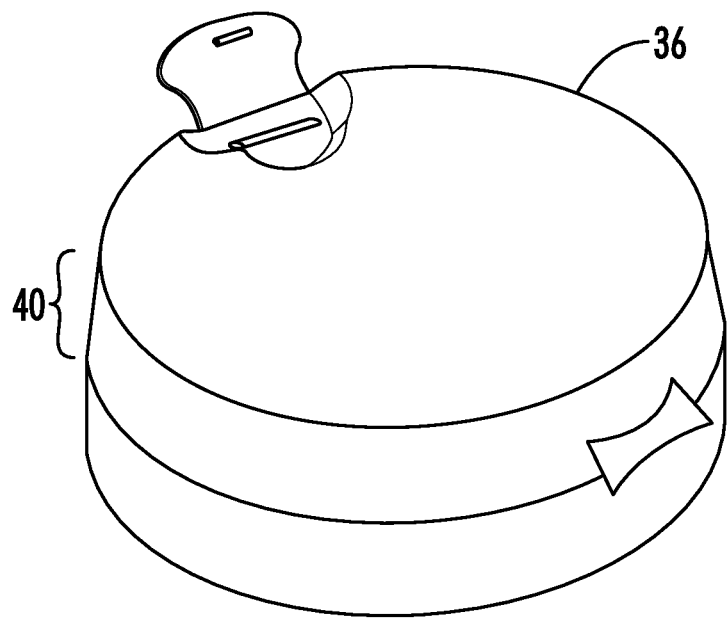
FIG. 7 is a perspective view of a lid for the container of FIG. 1.
Figure 8:
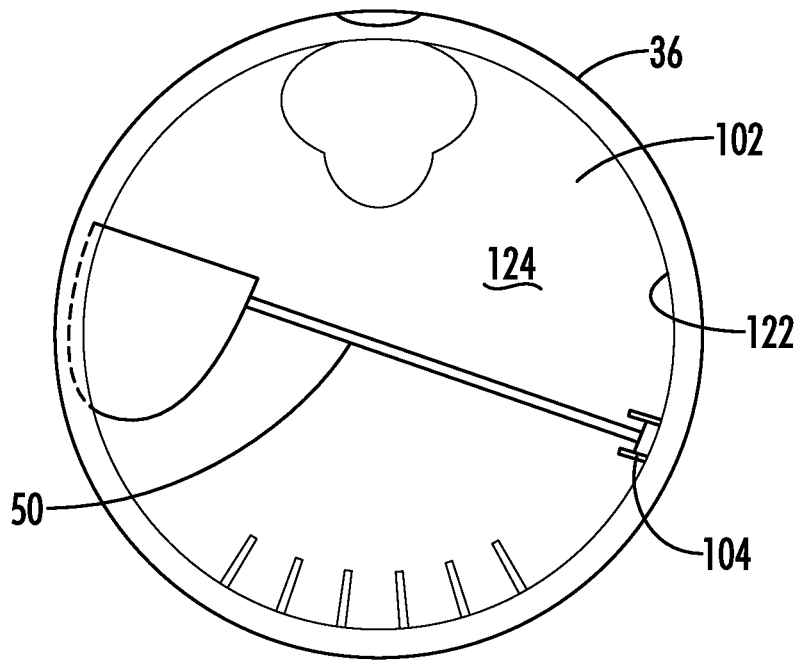
FIG. 8 is a bottom view of the lid of FIG. 7 and the measuring device of FIG. 3 is engaged with the lid by a retention mechanism.

The upper portion 18 may be associated with a lid 36, seen in FIG. 7. The lower portion 26 has a base 38 configured to receive a complementary raised circumferential portion 40 of the lid 36 such that multiple containers 10 can be stacked on top of one another. The lid 36 can be mounted on the upper portion 18. The container 10 can be configured to be stackable. A stackable container 10 can allow for increased shipping efficiency by allowing more containers to be shipped per cubic volume of cargo space and can result in less damage during shipment, as stackable containers are less likely to freely move during shipment. Additionally, stackable container 10 can be beneficial because it may allow for resellers to stack the container 10 on each other on shelves. Further, the stackable container 10 may be desirable by end-users because it allows an end-user to more efficiency and conveniently store multiple containers 10.

The container height 16 may be in a range from about 50 mm to about 300 mm, more preferably, in a range of from about 75 mm to about 250 mm, and most preferably, in a range of from about 90 mm to about 175 mm. The container height 16 may be related to the measuring device 50 maximum length 108, so that the measuring device is long enough to conveniently reach the bottom of the container 10.

The bottom diameter 34 may be from about 50 mm to about 200 mm, more preferably from about 75 mm to 175 mm, and most preferably from about 90 to about 160 mm.

The narrowest cross-sectional area 42 may have a diameter 44 from about 90% to about 98% of the bottom diameter 34. The narrowest cross-section area 42 may also be described as having a diameter 44 in a range of from about 2 mm to about 20 mm less than the diameter 34 of the bottom 30.

Features such as the pillar shaped container, the metallic container, the substantially equal top and bottom diameters, the lower height 28 and the upper height 20 each being in a range of from about 10% to about 20% of the container height 16, the vertical symmetry of the container 10, the lower height 28 being substantially equal to the upper height 20, and the diameter 44 about 90% to about 98% of the bottom diameter 34 may increase the structural rigidity of the container 10. Increased container structural integrity can be advantageous, for example, because it allows for fewer materials to be used in the manufacturing of the container 10 because the sidewall 12 and bottom 30 can be thinner. A container 10 with increased structural integrity can better withstand stresses during its shipment, increasing the likelihood that the container 10 will not be compromised before it reaches the end-user.

Figure 2:
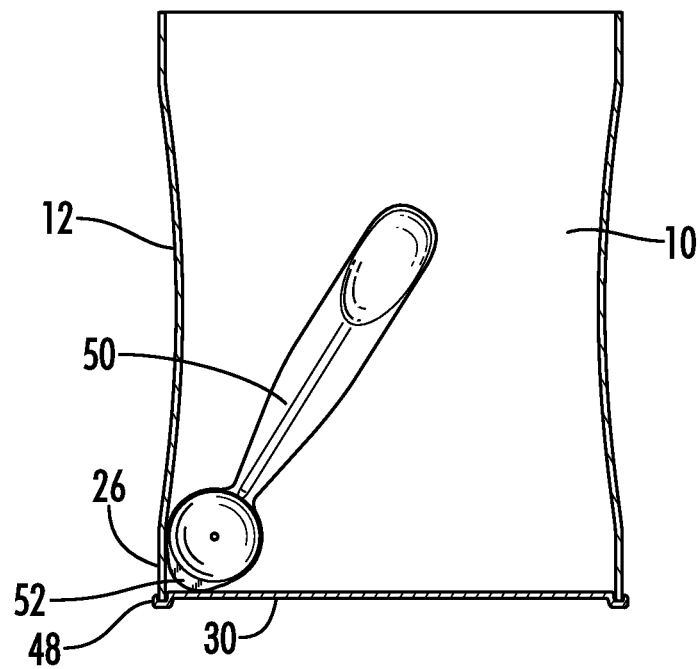
FIG. 2 is a perspective view of a cross-section of a container and an associated measuring device.

In FIG. 2, the container 10 is associated with a measuring device 50, shown in FIGS. 3-6. The measuring device 50 can be used by the end-user to measure, scoop and dispense the product held in container 10. Measuring device 50 has a tapered tip 52 aimed at increasing efficiency, ease and accuracy of scooping, measuring and dispensing the granular product contained by the container 10. The lower portion 26 of container 10 joins the bottom 30 at a rolled edge 48. The rolled edge 48 is a closure member and is integrally formed with the sidewall 12 and the bottom 30. The rolled edge 48 may also be formed as standard double seam metal can bottom joint. Such a joint may provide a substantially 90° junction between the bottom 30 and sidewall 12. An end-user can use the measuring device 50 with the tapered tip 52 with the associated container 10 to scoop granular product contained in the container 10, particularly along where the rolled edge 12 in the interior of the container 10.

Figure 3:
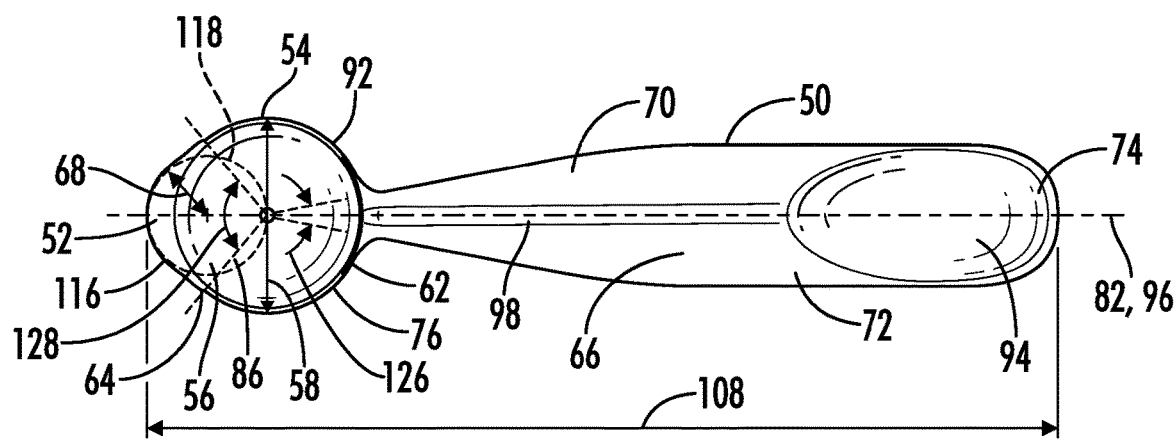
FIG. 3 is a top view of a measuring device.

A top view of the measuring device 50 is shown in FIG. 3. The measuring device 50 includes a bucket 54. The bucket 54 holds the granular product for a container 10 after the end-user has scooped the granular product from the container 10. The bucket 54 includes a substantially circular top cross-sectional area 56 having an outside diameter 58. The bucket has a depth 90 in a range of from about 75% to about 250% of the diameter of the bucket 54. The outside diameter 58 and depth 90 relate to the amount of granular product the bucket 54 is able to hold, which may be adjusted according to the amount of granular product to be dispensed. The bucket 54 has a handle side 62 and an oppositely facing distal side 64. The measuring device 50 has a handle 66 connected to the handle side 62 of the bucket 54. The handle 66 may be integrally formed on the bucket at a junction point 120 below the substantially circular top cross-sectional area 56. The measuring device 50 may be operable with a feeding bottle. The feeding bottle may have a larger mouth than the bucket diameter 58. The positioning of the junction point relative to the top of the bucket allows the user to place the top end of the bucket 54 inside the feeding bottle. The engaged bucket 54 and feeding bottle allows the bucket 54 to resist lateral sliding forces that would otherwise result in product spillage when the user dispenses product into the feeding bottle from the measuring device 50.

The measuring device 50 includes a tapered tip 52 formed on the distal side 64 of the bucket, the tapered tip 52 being longitudinally aligned with the handle 66. The tapered tip 52 has a tip radius 68, preferably no greater than 10 mm.

The longitudinal alignment of tip 52 with handle 66 increases ergonomics and makes more convenient, efficient and effective the measuring, dispensing and scooping actions of the measuring device 50. The handle has a tapered base portion 70 and a substantially straight arm portion 72 that increase ergonomics of the handle 66. The straight arm portion has a rounded end 74 opposite to the tapered arm portion 70 that further increases ergonomics. The base portion 70 is integrally formed on the handle side 62 of the bucket 54.

The bucket 54 has a cylindrical exterior surface 76. The tapered tip 52 may extend outward from the exterior surface 76 in a range of from about 10% to about 30% of the diameter of the bucket. The outward extension of the tapered tip 52 of from about 10% to about 30% of the diameter of the bucket 78 increases the convenience, efficiency and effectiveness with which the end-user may scoop, measure and dispense the granular product held by container 10.

Figure 4:
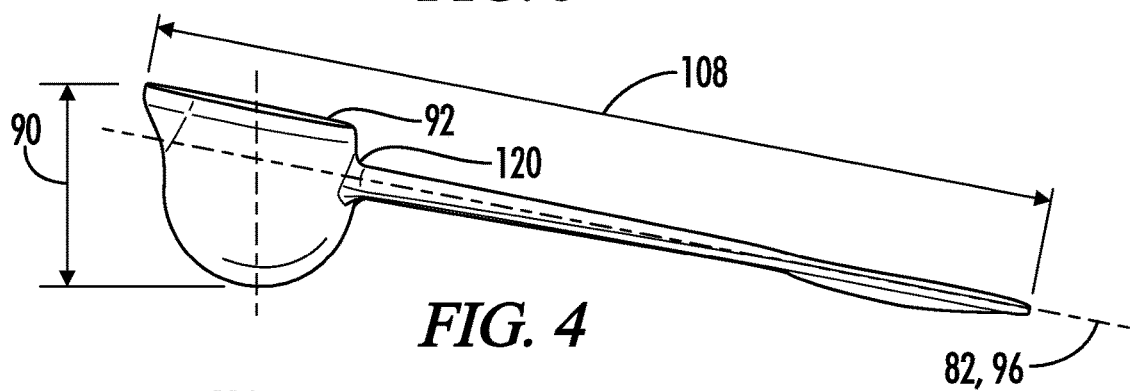
FIG. 4 is a side view of the measuring device of FIG. 3.
Figure 5:
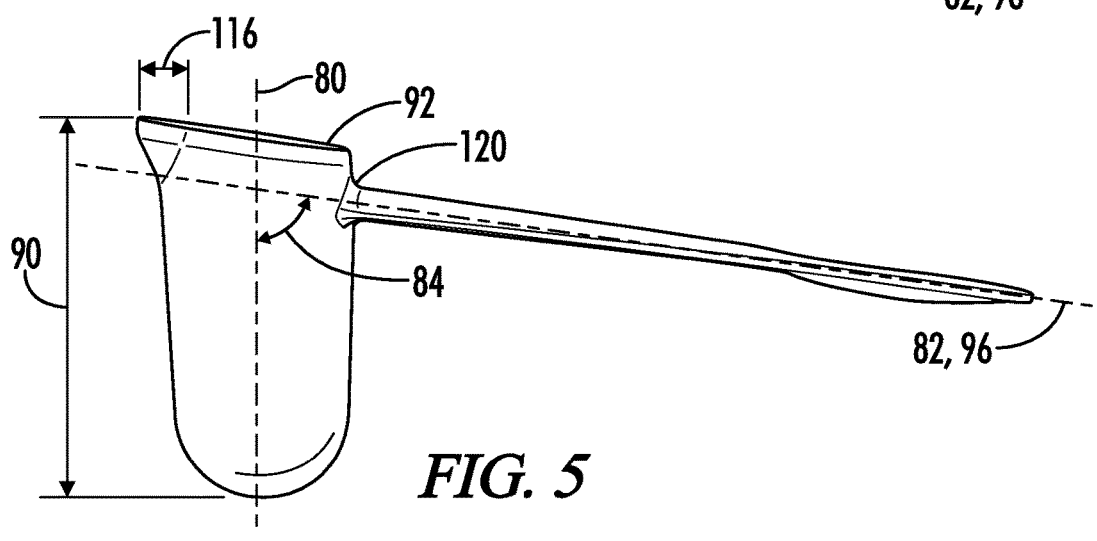
FIG. 5 is a side view of an alternate embodiment of a measuring device.
Figure 6:
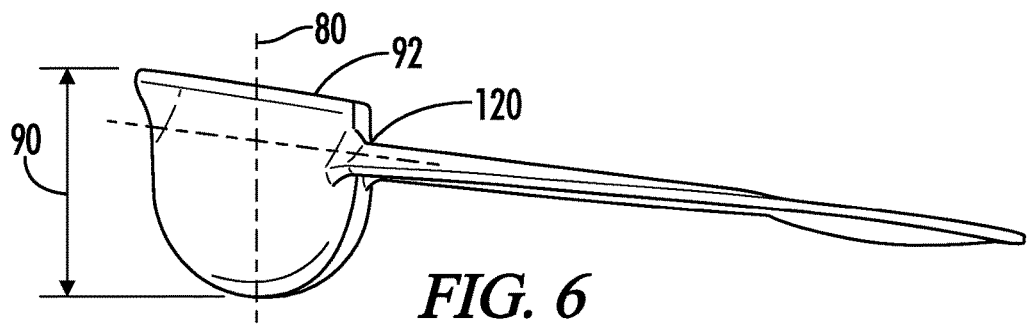
FIG. 6 is a side view of another alternate embodiment of a measuring device.

The bucket 54 has a central vertical axis 80, as shown in FIGS. 4-6. The measuring device 50 has a longitudinal axis 82 that intersects the central vertical axis 80 defining an intersection angle 84 in a range of from about 75 degrees to about 90 degrees, as shown in FIG. 5. The intersection angle 84 may make the measuring device 50 more effective, efficient and ergonomic at scooping, measuring and dispensing the granular product held by container 10.

The bucket 54 may have an interior 86 having a volume of from about 5 cubic centimeters to about 30 cubic centimeters, preferably from about 10 cubic centimeters to about 25 cubic centimeters. A range of bucket volumes are shown in FIG. 4, FIG. 5 and FIG. 6 by varying the depth 90 of the bucket 54. The bucket volume and depth may be varied according to the amount of granular product to be dispensed.

The bucket 54 has a circumference 92 extending 360 degrees around the bucket 54. The handle 66 may circumscribe an angle 126 from about 10 degrees to about 60 degrees of the bucket circumference 92, and the tapered tip 52 may circumscribe an angle 128 from about 50 degrees to about 90 degrees of the bucket circumference 92. In a preferred embodiment, the handle 66 may circumscribe an angle 126 from about 10 degrees to about 30 degrees of the bucket circumference 92, and the tapered tip may circumscribe an angle 128 from about 60 degrees to about 80 degrees of the bucket circumference 92. In the example shown in FIG. 3, the handle 66 circumscribes the bucket circumference 92 at an angle 126 of 21 degrees, and the tapered tip 52 circumscribes the bucket circumference 92 at an angle 128 of 70 degrees. The degree that the tapered tip 52 and handle 66 circumscribe around the bucket increases the structural integrity of the measuring device 10 while increasing the efficacy with which the end-user can scoop, measure and dispense the granular product from the container 10.

The substantially straight arm portion 72 may have a surface indentation 94. The surface indentation 94 increases ergonomics of the measuring device 50, because it provides an indentation for an end-user's finger for increased grip in use of the measuring device 10. In addition, the surface indentation can increase structural integrity of the handle 66.

The handle 66 has a longitudinal center axis 96 and a ridge 98 formed along the longitudinal center axis 96 of the handle 66. The ridge 98 is raised from about 1 mm to about 10 mm from the substantially straight arm portion 72. The ridge 98 may also increase the structurally rigidity of the handle 66.

The container 10 further comprises a lid 36 having an underside 102 and a retention element 104 configured to retain the measuring device 50 proximate to the underside 102 of the lid 36. Retention element 104 may extend from inner perimeter 122 of the lid 36, or from underside 124 of lid 36. One benefit of retention element 104 is that it can hold measuring device 50 outside of the product such that a user does not have to insert hands or fingers into the product to retrieve measuring device 66. This avoids inconvenience to the user and can help prevent contaminates from being introduced in the product and on a user's hands or fingers from coming into contact with the powder.

The container 10 has a height 16 and the measuring device 50 has a maximum length 108 of from about 50% to about 110% the height 16 of the container 10. The maximum length 108 may be varied according to the height of the container 10 so that the measuring device 50 can be efficiently, effectively and ergonomically used by the end-user to scoop, measure and dispense the granular product from the container 10. The maximum length may be varied such that it is easy for the end-user to scoop from the bottom on the container. Further, the maximum length 108 may be varied so that the measuring device 50 is operable with the retention element 104.

The tapered tip 52 may be described as having a profile 116 defined by a circle 118 having a diameter in a range of from 60% to 80% of the bucket diameter 58. The tapered tip 52 can curve outward from bucket 54 so that the curve is defined by the profile of the circle 118. The circle 118 can be centered with or variably off-set from the center axis 80 of the bucket 54. Further, the greater the circle 118 is off-set from the center axis 80, the more the tapered tip protrudes and curves continuously outward relative to the center axis 80 of the bucket 54. The circle 118 may pass through the central axis 80 of the bucket 54. The diameter of the circle 80 may be varied in a range of from 60% to 80% of the bucket diameter as to vary the relative shape and size of the tapered tip as compared to the bucket 54.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the versions contained therein.

Thus, although there have been described particular embodiments of the present invention of a new and useful container and associated measuring device, it is not intended that such references be construed as limitations upon the scope of this invention except as set forth in the following claims.

What is claimed is:

1. A container, comprising:
    a sidewall having a substantially circular cross-section and a container height and comprising:
        a cylindrical upper portion having an upper height defining a circular top;
        a continuously concave curved intermediate portion extending downward from the upper portion; and
        a cylindrical lower portion having a lower height and extending downward from the intermediate portion, wherein each of the upper height and lower height are at least 10% of the container height and the upper height and the lower height combined are in a range of from about 20% to about 35% of the container height; and
        a bottom closing the lower portion,
    wherein the cylindrical upper portion and the cylindrical lower portion each have a constant cross-sectional radius that remains unchanged vertically,
    wherein the cylindrical upper portion and the cylindrical lower portion are aligned with the circular top and the bottom respectively, and
    wherein the upper portion height and the lower portion height are substantially equal.

2. The container of claim 1, wherein the top is open.

3. The container of claim 1, wherein the container is metallic.

4. The container of claim 1, wherein the top has a top diameter; and the bottom has a bottom diameter substantially equal to the top diameter.

5. The container of claim 1, wherein the upper portion is associated with a lid, and the lower portion has a base configured to receive a raised circumferential lid portion in a lid of another like container such that multiple assembled containers can be stacked on top of one another.

6. The container of claim 1, wherein the container has a container height in a range of from about 50 mm to about 300 mm.

7. The container of claim 6, wherein the container height is in a range of from about 75 mm to about 250 mm.

8. The container of claim 1, wherein the bottom has a bottom diameter of from about 50 mm to about 200 mm.

9. The container of claim 8, wherein the bottom diameter is from about 75 mm to about 175 mm.

10. The container of claim 1, wherein the intermediate portion has a narrowest cross-sectional area, and the container is vertically symmetric about the narrowest cross-sectional area.

11. The container of claim 1, wherein the intermediate portion has a narrowest cross-sectional area, and the narrowest cross-sectional area of the container has a diameter from about 80% to about 98% of a diameter of the bottom.

12. A pillar shaped metal can, comprising:
    a circular bottom having a diameter in a range from 100 mm to 150 mm;
    a sidewall comprising:
        a lower portion extending from the circular bottom and having a lower height;
        a continuously curved concave portion extending upward from the lower portion and having a concave portion height; and
        an upper portion extending upward from the concave portion oppositely from the circular bottom and having an upper height and a circular opening, wherein the lower height and upper height combined are in a range of from about 20% to about 50% of the concave portion height,
    wherein the continuously curved concave portion has a narrowest cross-sectional area, and the container is vertically symmetrical around the narrowest cross-sectional area,
    wherein the narrowest cross-sectional area has a diameter in a range of from about 80% to about 98% of the diameter of the circular bottom,
    wherein the circular opening has a diameter substantially equal to the diameter of the circular bottom,
    wherein the upper portion and the lower portion each have a constant cross-sectional radius that remains unchanged vertically and wherein the upper portion and the lower portion are aligned with the circular opening and the circular bottom respectively, and
    wherein the lower height is substantially equal to the upper height.

13. The can of claim 12, wherein the can has a can height in a range of from about 125 mm to about 200 mm.

14. The can of claim 12, wherein the can height is in a range of from about 145 mm to about 170 mm.

15. The can of claim 12, further comprising a lid mounted on the upper portion, and wherein the lower portion has a base configured to receive a raised circumferential lid portion in a lid of another like container such that multiple assembled cans can be stacked on top of one another.

16. The can of claim 12, wherein the narrowest cross-sectional area has a diameter in a range from 2 mm to 20 mm less than the diameter of the circular bottom.

17. The can of claim 12, wherein the narrowest cross-sectional area has a diameter in a range from about 4 mm to about 14 mm less than the diameter of the circular bottom.

18. The can of claim 12, wherein the can has a can height, and the lower height and upper height are each in a range from about 10% to about 20% of the can height.

* * * * *